United States Patent
Mujoo et al.

(10) Patent No.: US 12,073,101 B2
(45) Date of Patent: Aug. 27, 2024

(54) PROCESSING OUT OF ORDER WRITES IN A LOG STRUCTURED FILE SYSTEM FOR IMPROVED GARBAGE COLLECTION

(71) Applicant: EMC IP Holding Company LLC, Hopkinton, MA (US)

(72) Inventors: Ashwani Mujoo, San Jose, CA (US); Ramprasad Chinthekindi, San Jose, CA (US); Abhinav Duggal, Santa Clara, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 18/328,474

(22) Filed: Jun. 2, 2023

(65) Prior Publication Data

US 2023/0315319 A1    Oct. 5, 2023

Related U.S. Application Data

(63) Continuation of application No. 17/227,805, filed on Apr. 12, 2021, now Pat. No. 11,704,038.

(51) Int. Cl.
*G06F 3/06* (2006.01)
*G06F 12/02* (2006.01)
*G06F 16/17* (2019.01)

(52) U.S. Cl.
CPC .......... *G06F 3/0641* (2013.01); *G06F 3/0613* (2013.01); *G06F 3/0619* (2013.01);
(Continued)

(58) Field of Classification Search
CPC .... G06F 3/0641; G06F 3/0616; G06F 3/0619; G06F 3/0652; G06F 3/067; G06F 12/0253; G06F 16/1727
See application file for complete search history.

(56) References Cited

U.S. PATENT DOCUMENTS 9,552,407 B1 * 1/2017 Hurst .................... G06F 16/275
10,795,812 B1 * 10/2020 Duggal .................. G06F 3/067
(Continued)

OTHER PUBLICATIONS

Douglis et al. "The Logic of Physical Garbage Collection in Deduplicating Storage," Mar. 2017, Proceedings of the 15th USENIX Conference on File and Storage Technologies, pp. 29-43 (Year: 2017).*

*Primary Examiner* — Michael Krofcheck
(74) *Attorney, Agent, or Firm* — Staniford Tomita LLP

(57) ABSTRACT

Improving performance of garbage collection (GC) processes in a deduplicated file system having a layered processing architecture that maintains a log structured file system storing data and metadata in an append-only log arranged as a monotonically increasing log data structure of a plurality of data blocks wherein a head of the log increases in chronological order and no allocated data block is overwritten. The storage layer reserves a set of data block IDs within the log specifically for the garbage collection process, and assigns data blocks from the reserved set to GC I/O processes requiring acknowledgment in a possible out-of-order manner relative to an order of data blocks in the log. It strictly imposes using in-order I/O acknowledgement for other non-GC processes using the storage layer, where these processes may be deduplication backup processes using a segment store layer at the same protocol level as the GC layer.

19 Claims, 5 Drawing Sheets

(52) U.S. Cl.
 CPC ............ *G06F 3/0652* (2013.01); *G06F 3/067* (2013.01); *G06F 12/0253* (2013.01); *G06F 16/1727* (2019.01)

(56) References Cited

U.S. PATENT DOCUMENTS

| | | | |
|---|---|---|---|
| 2008/0282023 A1* | 11/2008 | Biswas | G06F 12/0246 711/E12.084 |
| 2009/0228630 A1* | 9/2009 | Wang | H04L 49/90 711/E12.001 |
| 2011/0231599 A1* | 9/2011 | Kawamura | G06F 12/0866 711/E12.008 |
| 2015/0052395 A1* | 2/2015 | Wipfel | G06F 3/0683 714/19 |
| 2019/0266081 A1* | 8/2019 | Gupta | G06F 3/0659 |

* cited by examiner

PROCESSING OUT OF ORDER WRITES IN A LOG STRUCTURED FILE SYSTEM FOR IMPROVED GARBAGE COLLECTION

CROSS-REFERENCE TO RELATED APPLICATIONS

The present application is a Continuation application and claims priority to U.S. patent application Ser. No. 17/227,805 filed on Apr. 12, 2021, entitled "Processing Out of Order Writes in a Log Structured File System for Improved Garbage Collection," and assigned to the assignee of the present application.

TECHNICAL FIELD

This invention relates generally to data recovery processes, and particularly to processing out-of-order writes in a log structured file system to improve garbage collection.

BACKGROUND OF THE INVENTION

In log structured file systems, data and metadata is written sequentially to the head of an append-only log for a better write throughput. The data writes in a log structured file system never overwrite an existing block. The log is a monotonically increasing ID data structure in which a new version of the file data is written to a new block and causes the data in the old blocks of the file to be partially or fully dead. To reclaim such dead space from the system, garbage collection (GC) processes are used to free up space for other data. The garbage collection process reads an old block, copies the live data from it to a new block, and deletes the old block.

In a log structured file system, data recovery is simplified due to the in-order acknowledgement of I/O completions from the storage layer to the upper layers in the file system stack. When a crash happens, the recovery effort involves rolling forward from the last consistency checkpoint. Since the order of block IDs is known, recovery looks for contiguous valid allocated blocks after the consistency checkpoint. Once an invalid block is encountered, recovery is stopped at that point and no further valid blocks are sought beyond this point. Hence, the crash recovery is simplified due to enforcing of in order write acknowledgement.

The copy forward phase of Garbage Collection involves copying live segments from old data blocks to newer data blocks in the storage layer. However, due to different latencies that may be present in lower processing layers, blocks may occasionally be written out of order. To maintain the in-order writing of blocks, a bunch of copy forwarded blocks cannot get acknowledged if a few initial blocks (predecessors) are delayed due to network connectivity issues, slow disk I/O, or similar latency issues. This can result in very low throughput in the GC copy forwarding cycle, because of these connectivity or other issues. In the case of in-order acknowledgement, time taken by each I/O is dependent upon the slowest predecessor operation in the list of pending I/O operations. Since the level of storage layer concurrency is lower than the GC batch size, the entire GC batch can be done in several iterations of the storage layer concurrent batch.

What is needed, therefore, is a way to process pseudo out of order writes in a log structured file system for improved garbage collection performance.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, and Data Domain Restorer are trademarks of DellEMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1:
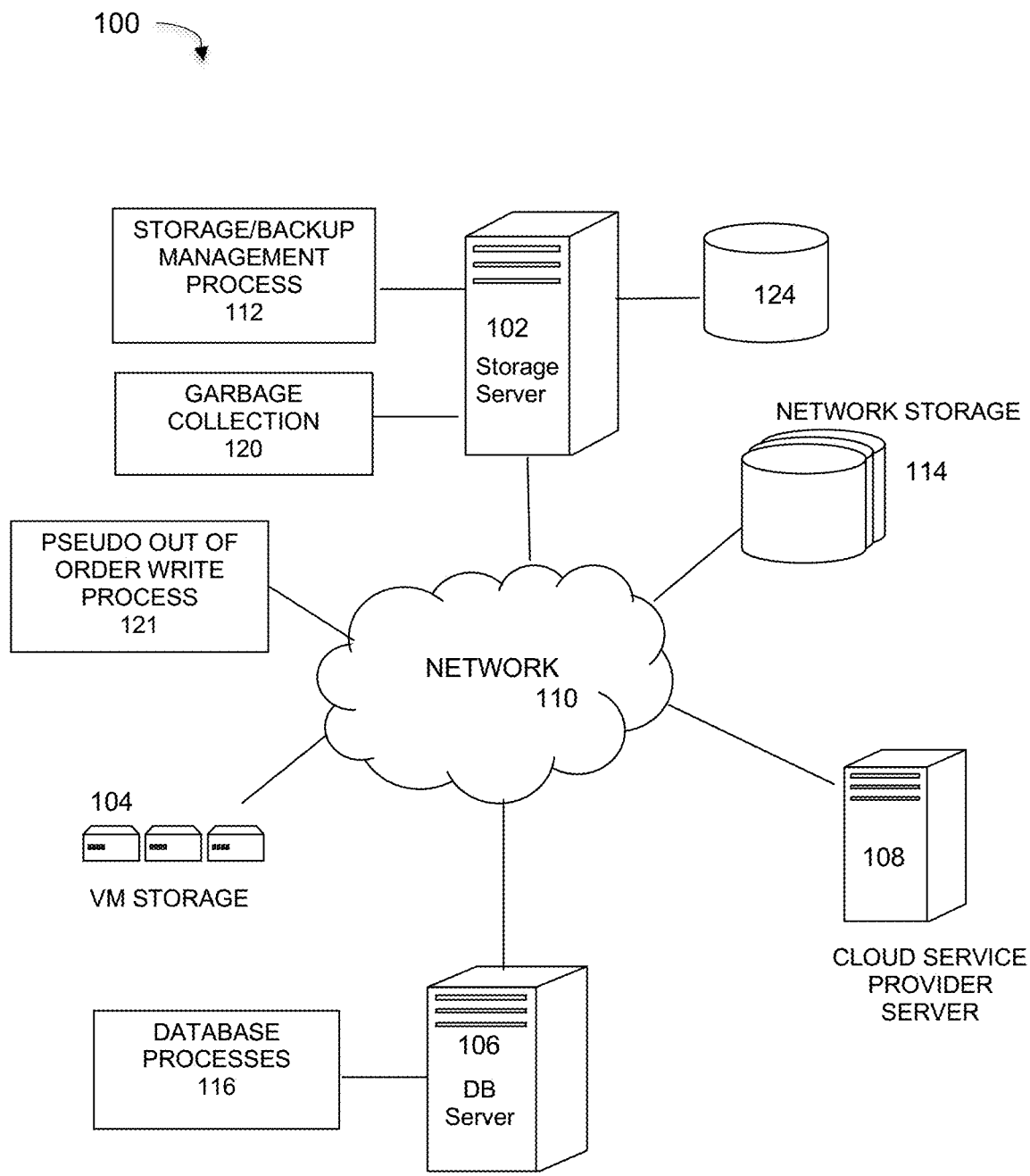
FIG. 1 is a diagram of a deduplication backup network implementing pseudo out-of-order writes for garbage collection processing, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve data processing and storage in a distributed system, such as a cloud based network system or very large-scale wide area network (WAN), metropolitan area network (MAN), however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Embodiments are described for a method to provide pseudo out of order write processing in a log-structured file system for improved garbage collection. FIG. 1 illustrates a computer network system that implements one or more embodiments of a deduplication backup system implementing a garbage collection (GC) process 120, under some embodiments. In system 100, a storage server 102 executes a data storage or backup management process 112 that coordinates or manages the backup of data from one or more data sources 108 to storage devices, such as network storage 114, client storage, and/or virtual storage devices 104. With regard to virtual storage 114, any number of virtual machines (VMs) or groups of VMs (e.g., organized into virtual centers) may be provided to serve as backup targets. The VMs or other network storage devices serve as target storage devices for data backed up from one or more data sources, such as storage server 102 or data source 106, in the network environment. The data sourced by the data source may be any appropriate data, such as database data that is part of a database management system, and the data may reside on one or more hard drives for the database(s) in a variety of formats. Thus, data source 106 maybe a database server executing one or more database processes 116, or it may be any other sources data for use by the resources of network 100.

The network server computers are coupled directly or indirectly to the data storage 114, target VMs 104, and the data sources and other resources through network 110, which is typically a cloud network (but may also be a LAN, WAN or other appropriate network). Network 110 provides connectivity to the various systems, components, and resources of system 100, and may be implemented using protocols such as Transmission Control Protocol (TCP) and/or Internet Protocol (IP), well known in the relevant arts. In a cloud computing environment, network 110 represents a network in which applications, servers and data are maintained and provided through a centralized cloud computing platform.

In an embodiment, cloud network 110 may be a private network or it may be a public network provided by a third-party cloud service provider (CSP) 108. The data generated or sourced by system 100 and transmitted over network 110 may be stored in any number of persistent storage locations and devices. In a backup case, the backup process 112 causes or facilitates the backup of this data to other storage devices of the network, such as network storage 114, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays.

In an embodiment, system 100 may represent a Data Domain Restorer (DDR)-based deduplication storage system, and storage server 102 may be implemented as a DDR Deduplication Storage server provided by EMC Corporation. However, other similar backup and storage systems are also possible. In general, Data Domain is a purpose-built backup appliance providing streaming deduplication that is able to ingest data at full network speeds, from multiple backup sources while providing storage efficiency. Present Data Domain systems are able to use tiered data storage technologies, such as very large multi-terabyte SATA drive trays, or SSD-enabled fast ingest trays. Data Domain has a logical extension to its file system and MTree organization which allows a data movement policy to be applied to aging backup content.

Deduplication backup systems, such as the DellEMC Data Domain system use deduplication techniques as a form of single-instance storage that eliminates redundant copies of data to reduce storage overhead. Data compression methods are used to store only one unique instance of data by replacing redundant data blocks with pointers to the unique data copy. As new data is written to a system, duplicate chunks are replaced with these pointer references to previously stored data. Though storage requirements are greatly reduced, processing overhead is increased through the processes of deduplication. To service an input/output (I/O) operation initiated from an external backup application, the Data Domain File System (DDFS) must initiate multiple internal I/O operations, such as to lookup LP segment fingerprints, look up indexes, read container metadata, and to read the actual data before servicing the I/O to the backup application. In addition to the external backup application workload there could be some internal file system maintenance operations, such as garbage collection 120, and so on, that are concurrently executed to keep the system at an optimal state. The I/O's that are initiated as part of backup application workload as well as the internal maintenance operations would be serviced from the same storage devices.

In a log structured file system with deduplication capability, the writes to the file system are deduplicated and only unique or new data is written to the system. As stated above, data deduplication is a form of single-instance storage that eliminates redundant copies of data to reduce storage overhead. Data compression methods are used to store only one unique instance of data by replacing redundant data blocks with pointers to the unique data copy. As new data is written to a system, duplicate chunks are replaced with these pointer references to previously stored data. The DellEMC Data Domain is an example of a log structured deduplication file system. As data is ingested to the Data Domain file system (DDFS), the data is segmented into segments (or chunks) and hash fingerprints are calculated for these data segments. These fingerprints are then looked up in the in-memory fingerprint cache or on-disk fingerprint index table for deduplication. Only those segments which cannot be deduplicated are grouped together in a region and a bunch of such regions are grouped and written to a block or container on disk and index is updated with the fingerprints corresponding to these new chunks being written. The physical storage for a log structure file system could comprise one or more block-based devices or object-based storage. The head of the log keeps on moving (or increasing) in chronological order and consuming blocks, as there is no overwriting of already allocated blocks. This log structure gives a better write throughput by buffering writes into a sequential append writes. Consistency points are set at several instances to ensure faster recovery with such log-structured file systems.

The Data Domain File System (DDFS) is an inline data deduplication file system. As data gets written to the file system, DDFS breaks it into variable sized segments and a group of segments are packed in a compression region. A number of compression regions are grouped together and written as a container to disk. DDFS calculates fingerprint signatures for each segment using a SHA1 (secure hash algorithm 1) algorithm. DDFS has an on-disk fingerprint index table that maps the fingerprint to the container-ID that has the corresponding segment data. The container has a metadata section followed by several data sections. The data sections store the compression regions; and the container metadata section stores the meta information of the container, i.e., it stores the total number of compression regions, the total number of segments, the fingerprint of each segment, and so on.

A segment is considered live if it can be referenced by any live content in the file system. The file system packs the segments into containers that are written to disk in a log-structured manner. Each container is structured into sections. The first section is the metadata section and the following sections are referred to as compression regions. In the metadata section there are all the references or fingerprints that identify the segments in the container. A container manager may be used that is responsible to maintain the log-structured container set and provide a mapping from container identifiers (CID) to block offset on disk. This mapping is entirely stored in memory. The garbage collection process of the file system is responsible for enumerating all live segments in the live content handles of the file system. In a physical garbage collection process, the enumeration algorithm carries out a breadth-first traversal of all the files in the file system.

In an embodiment, system 100 implements a log structured file system in which data and metadata are written sequentially to a log that is implemented as a circular buffer. Log-structured file systems must reclaim free space from the tail of the circular buffer log to prevent the file system from becoming full when the head of the log wraps around to meet to the tail of the log. The tail can release space and move forward by skipping over data for which newer versions exist farther ahead in the log. If there are no newer versions, then the data is moved and appended to the head. This is performed by a garbage collector function, which may execute certain GC policies to remove file segments or blocks that are marked for deletion. Such policies can specify a periodic cleaning schedule during which the garbage collector runs a cleaning operation. The cleaning operation may include enumerating the files in the file system of the backup system to identify files for blocks marked for deletion. Since a garbage collection can consume a significant amount of resources, the garbage collection policies allow the user to specify the conditions (e.g., times) when garbage collection may be run. The GC process 120 usually runs as a separate background job to scan all data segments in the file system to find out unreferenced data segments and remove them to release disk space. It also re-packs data into new objects in order to make data objects in similar size, since keeping all objects in as similar a size as possible generally helps performance, and prevents growing metadata due to storing very small objects.

Figure 2:
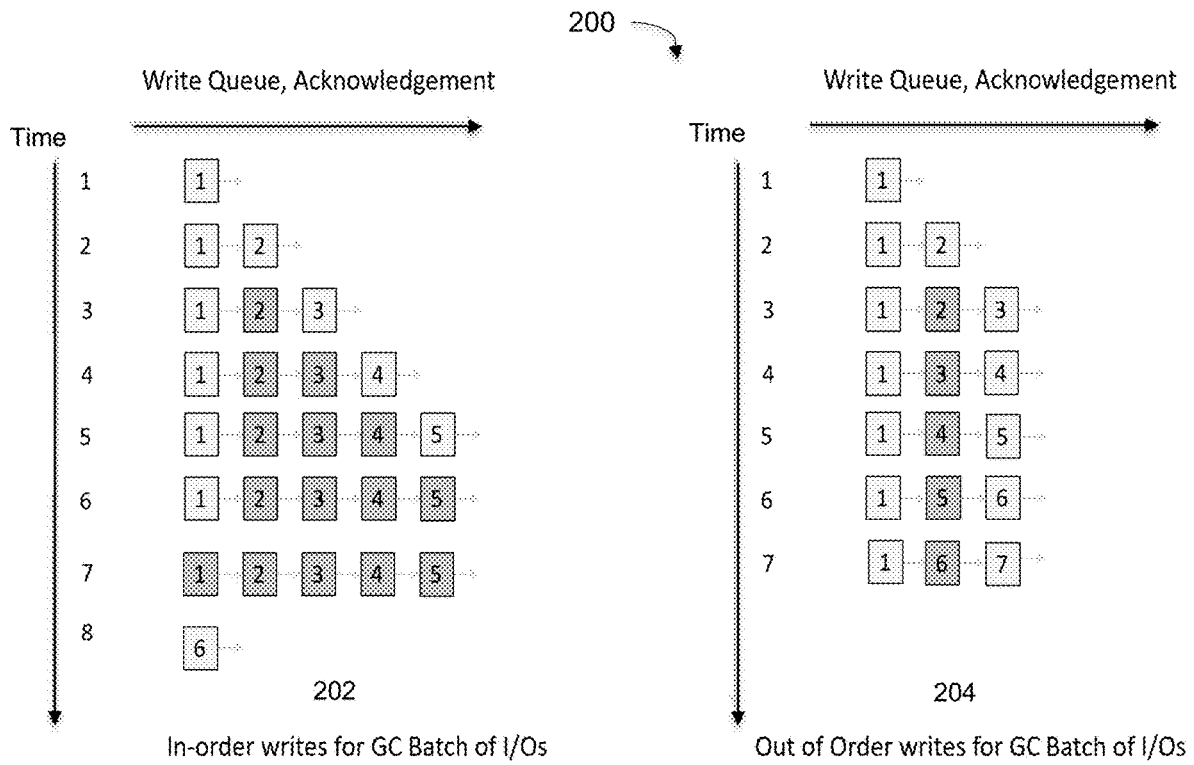
FIG. 2 illustrates in-order and out-of-order writes for batched I/Os for a garbage collection process, under an example embodiment.

In present systems, it is typical to acknowledge each block I/O completion in an in-order fashion. With in-order write acknowledgement, if the upper protocol layers (e.g., GC) submit many concurrent writes to the storage layer, the I/O acknowledgement of all the successor I/Os are blocked in the storage layer until the predecessor I/Os have not completed. FIG. 2 illustrates in-order and out-of-order writes for batched I/Os for a garbage collection process, under an example embodiment. FIG. 2 illustrates an example case in which the GC process submits data block I/Os 1, 2, 3, 4 and 5 in quick succession. For in-order processing, even if the storage layer has completed I/Os for 2-5, it blocks the acknowledgement of these I/Os, until I/O 1 has completed. This is depicted as process 202 of FIG. 2 as in-order write acknowledgement.

The in-order acknowledgment process can pose several challenges for present garbage collection methods. First, it significantly slows down the performance of GC, since GC cannot submit the subsequent I/Os to the storage layer. The GC copy forward phase works on a range of source data blocks (calling it a batch), at a time for copy forwarding live segments. For each batch, the GC process first copies forwards the older (source) data blocks to newer data blocks and then deletes the older blocks. Since, GC does not delete the source blocks, until the end of the batch copy forward, the I/O ordering does not matter for garbage collection. In the event of crash before GC processed the batch, the recovery can simply throw away the newer blocks written by the GC process, since the older blocks are still intact. Second, the storage layer is underutilized because it is holding the I/O acknowledgement of already completed I/Os since the predecessor I/Os have not completed yet. Third, it reduces the overall concurrency in the system. Fourth, for public cloud providers with object storage, there is a huge variation of latency for each I/O sent from the compute instance (on-premise or cloud) to the cloud-object storage. As a result, the first I/O can take much longer and the subsequent I/Os can complete much faster. Because of in-order acknowledgement, the pending I/O pipeline builds up stopping any further I/Os submissions. For system integrity, the process must still honor the in-order I/Os for application ingest. However, the order does not really matter for GC as explained above. So, the in-order acknowledgement of I/Os reduces the GC throughput significantly in environments where there is high degree of latency variation.

For example, the latency of block writes from an on-premise Data Domain system to a cloud object store may be on the order of 462 milliseconds (mean latency) to write a 4 MB object. However, the storage layer may keep the block I/O in its queue on an average for 604 milliseconds and waits for the predecessor I/Os to complete. Hence, the upper layer GC process sees more than double this latency for a single I/O completion. Hence the performance degrades substantially.

One method to circumvent the in-order notification and acknowledgement times is to increase the storage layer I/O concurrency and let the upper layers submit a greater number concurrent I/Os. However, this often simply results in overwhelming the storage layer I/O pipeline, also increases the memory and other system resource usage.

Embodiments of system 100 include a pseudo out of order write process 121 that improves garbage collection 120 performance by relaxing the in-order acknowledgment for GC processes, but keeps in-order acknowledgment for regular ingest from external sources (e.g., files from backup server, segmented stream, fingerprint, deduplication, and so on).

Figure 3:
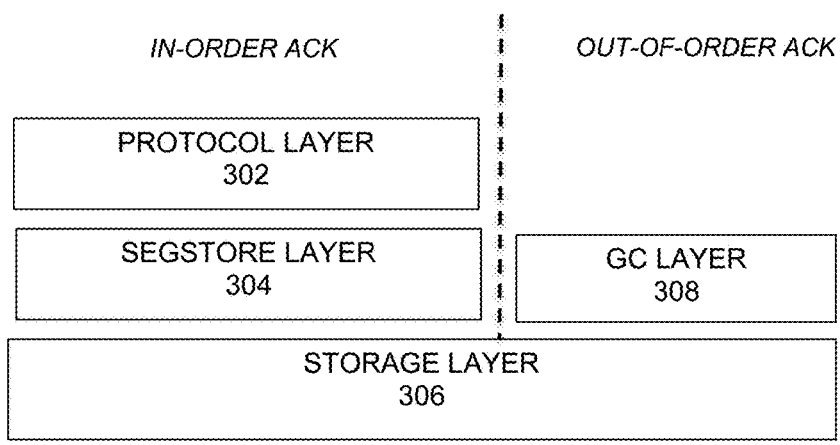
FIG. 3 is a block diagram of a processing layers implementing a pseudo out-of-order write process, under some embodiments.

FIG. 3 is a block diagram of a processing layers implementing a pseudo out-of-order write process, under some embodiments. As shown in FIG. 3, the main layers comprise a storage layer 306 for the storage devices and a protocol layer 302 for external data sources, such as deduplication backup programs, and so on. The middle layers comprise a segment store (Segstore) layer 304 and a garbage collection layer 308. In an embodiment, the Segstore and Protocol layers are constrained to strictly using in-order write acknowledgements, such as shown in FIG. 2, 202. Garbage collection processes, however, generally do not need to preserver a strict order. In this case, the GC layer 308 is thus allowed to use out-of-order write acknowledgements, such as illustrated in FIG. 2, 204. The use of both in-order and out-of-order write acknowledgements creates a pseudo out-of-order process for garbage collection to improve GC performance.

The stack architecture of FIG. 3 is used to implements a DDFS backup system, or any similar application system. DDFS backing up or archiving files results in writing blocks of data or metadata. DDFS is log-structured and the I/O spans across block and cloud object storage controlled by storage layer 306. The block storage is used to host the latency critical metadata blocks for efficient operation of the filesystem, like deduplication 304 or GC 308 enumeration to find live data references. Such blocks in the log are mirrored into the object storage into a logically separate address space. The cloud storage is used to host the actual data blocks. These blocks of data/metadata are constructed in the memory and are assigned an ID. These IDs are monotonically increasing in the order of which these blocks are expected to be written persistently. These assigned in-memory blocks are sent to the storage layer 306 and are persisted to storage with some level of concurrency. But the order or acknowledgement of completion is determined by the order of IDs.

For example, if a content handle has been written and acknowledged, when a superblock has been synced, the whole filesystem should be available before that sync point. This simplifies the storage layer recovery and faster turnaround times in case of crash. For example, during recovery, if 100 is the highest valid block ID, the log head of the file system is easily set to this ID. This would implicitly mean that all blocks less than 100 are also valid (i.e. there are no invalid blocks below the log head). To get to a consistent state, the storage layer 306 will validate each block from the previously persisted log head to at most max_outstanding_blocks. The max_oustanding_blocks is a configurable parameter which is defined by the concurrency of the system. The first invalid block discovered in this range will cause the storage layer log head to be set to one less than the first invalid block. This will also terminate the need to read any further blocks.

With respect to DDFS garbage collection, as described above, the copy forwarding phase of the GC process involves copying live segments from old data blocks to newer data blocks in the storage layer 306. Due to the maintaining the in-order writing of blocks, a bunch of copy forwarded blocks cannot get acknowledged if a few initial blocks (predecessors) are getting delayed due to network connectivity issues or slow disk I/O, resulting in very low throughput in the GC copy forwarding cycle, because of the cloud connectivity or some other issue.

Another use case is when the data and metadata is written in the cloud as cloud objects. For the case of garbage collection, some cloud providers provide APIs to do the copy forwarding of older data blocks to newer data blocks within the cloud, based on the <source_block_id, offset, length, destination_block_id> tuple information. This API is called during GC cycle which can run alongside other data and metadata I/O due to ingest. But since this API doesn't involve the data itself for the I/O, where GC only sends the tuple information, its turnaround time is much faster. Such GC I/Os can get bottlenecked when mixed up with regular ingest I/Os while doing in order acknowledgement. It is possible that acknowledgements are totally random based on the cloud provider characteristics. Due to block ID ordering in the storage layer 306 it is possible the first I/O took a longer time than the last in the max_outstanding_blocks concurrency window and the storage layer does not acknowledge the GC until it receives all the acknowledgements, hence slowing down the GC process. By relaxing the in-order acknowledgement requirement of the GC layer 308, these disadvantages are alleviated.

Embodiments of FIG. 3 provide pseudo out of order writes for doing the garbage collection. This process can also tolerate crashes. In a log structured filesystem, the recovery is simplified due to the in-order acknowledgement. But with the out of order crash recovery, it is not possible to find contiguous valid allocated blocks after a previous consistency checkpoint. That means that a roll forward of the log cannot happen. If the system recovers a recent block ID which has a dependency on old block ID which fails to get recovered, then filesystem cannot be consistent. Due to this reason, out of order acknowledgement cannot be applied for all the IOs falling into storage layer 306.

In the case of GC copy forward operations, however, the scenario is different. The order of acknowledgement need not be maintained, and the order does not matter. This is because in case of crash, the system can roll backward instead of roll forward and throw away all the GC reserved block IDs during recovery. This will not result in any loss of data, because the GC process still has the copy of data in the older blocks of data. The GC process deletes the older blocks from the batch only if the entire batch copy forward to newer blocks completes. Thus, the crash recovery is simplified.

The configuration of system 300 of FIG. 3 allows the storage layer 306 to efficiently handle I/Os coming from both the GC layer 308 and the Segstore layer 304 by imposing strict in-order processing on the Segstore layer I/Os and relaxing this in-order processing (by allowing out-of-order processing) for the GC layer I/Os. For crash recovery, differentiating between these in-order and out-of-order containers must be maintained. For this event, reserved containers are set aside for the GC processes. Thus, for example, containers 1-1000 may be reserved for GC processes, which may be treated out-of-order, while Segstore layer I/Os will use containers 1001 onward, and in-order processing may be used for these containers. Any gaps created by unused reserved containers (e.g., 500 to 1000), is usually inconsequential due to the size of the entire container space, and the infrequency of crash events. For crash recovery purposes, reserved containers IDs are be stored in in-memory persistent storage.

Figure 4:
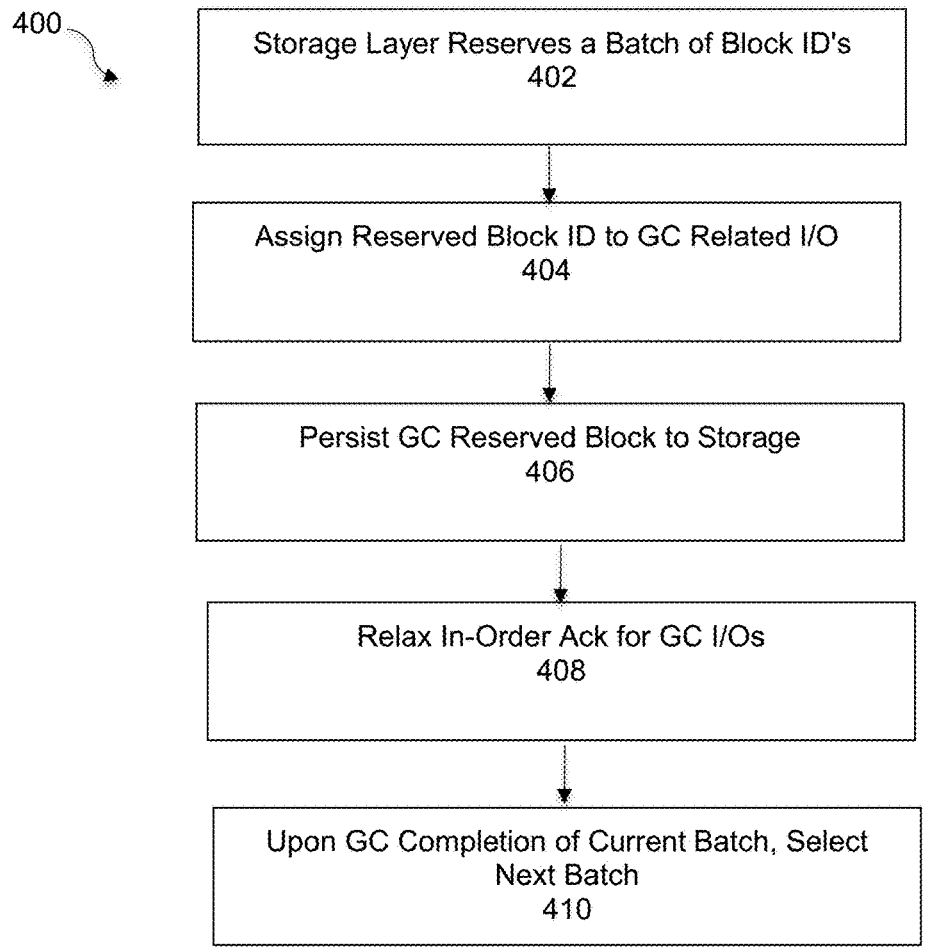
FIG. 4 is a flowchart that illustrates a process of implementing a pseudo out-of-order acknowledgement process for GC operations, under some embodiments.

FIG. 4 is a flowchart that illustrates a process of implementing a pseudo out-of-order acknowledgement process for GC operations, under some embodiments. As shown in FIG. 4, to distinguish between the GC I/Os and other I/Os (from ingest, etc.), process 400 begins with the storage layer reserving a batch of block ID's. Any GC related I/O gets ones of these blocks assigned from these reserved batch of IDs, 404. Depending upon the level of concurrency the blocks will get persisted to the storage, 406. The mechanism here is that the acknowledgement of in-order I/Os can be relaxed for GC related I/Os, 408. Every acknowledgement of an I/O results in the freeing of resources assigned for that I/O, so that these resources can be used for the next I/O in the pipeline. Once GC completes the current batch, the next batch is selected, and rest of GC process continues, 410. This speeds up the processing of whole GC batch significantly.

Figure 5:
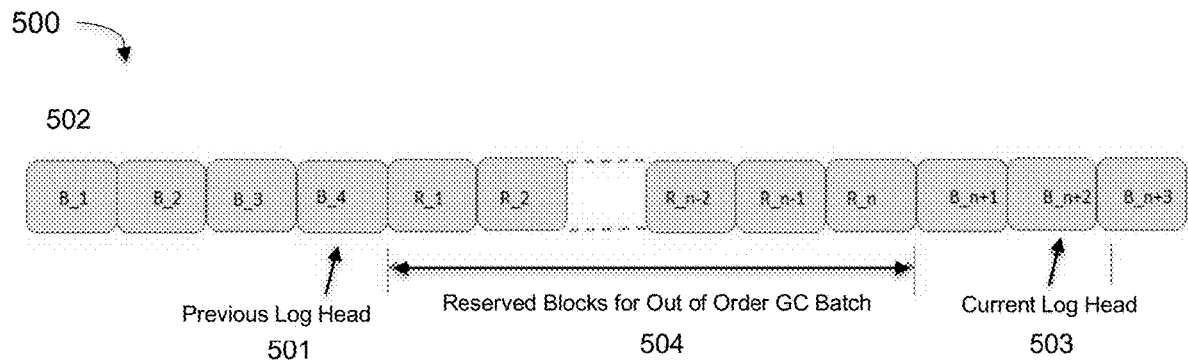
FIG. 5 illustrates reserved blocks for garbage collection with monotonically increasing block numbers, under an example embodiment.

FIG. 5 illustrates reserved blocks for garbage collection with monotonically increasing block numbers, under an example embodiment. Diagram 500 of FIG. 5 illustrates a series of blocks 502, denoted B_1, B_2, etc. These blocks include certain blocks 504 reserved for an out-of-order GC batch. These N reserved blocks are denoted R_1, R_2, up to R_n. After the set of reserved blocks 504, the regular blocks continue from B_n+1 to B_n+3, etc. The storage layer moves the log head from a previous location 501 to a current location 503 once the reservation is done and keeps up with the other non-GC writes until the next reservation request is received, where it jumps its log-head again. The number of reserved blocks 504 can be set to any practical number of blocks depending on the system configuration and requirements.

The reserved container range 504 must be persisted in some location which the storage layer 306 and the GC layer 308 can access. One embodiment uses a separate database like a registry or key-value store. The GC process can potentially fill up the network pipe with higher number of requests. If the cloud is responsive enough, then a very good GC copy forward speed can be achieved if the storage layer 306 is able to acknowledge the writes at a faster rate as it is written.

In general, GC processes can be run per set schedules, such as once every week or bi-weekly, and can take on the order of hours or even days. The block reservation process is generally performed each time a GC copy forward operation is performed, depending on GC scheduling, system configuration, and so on. The GC process may use certain tunable parameters such as batch size, liveness ratio, and so on. In general, the containers are of fixed size, such as 4.5 MB per container. A batch of containers may be defined as a set number, such as 1000 containers. The liveness ratio determined how many containers are copied forward. So, a liveness ratio of 50% would result in 500 containers being copied forward. The tunable parameters may be set or modified depending on performance requirements and resource constraints. A user can set the parameters through registry keys, or though User Interface (UI) tools to tailor the GC cycle, liveness ratio, batch sizes, and so on.

Figure 6:
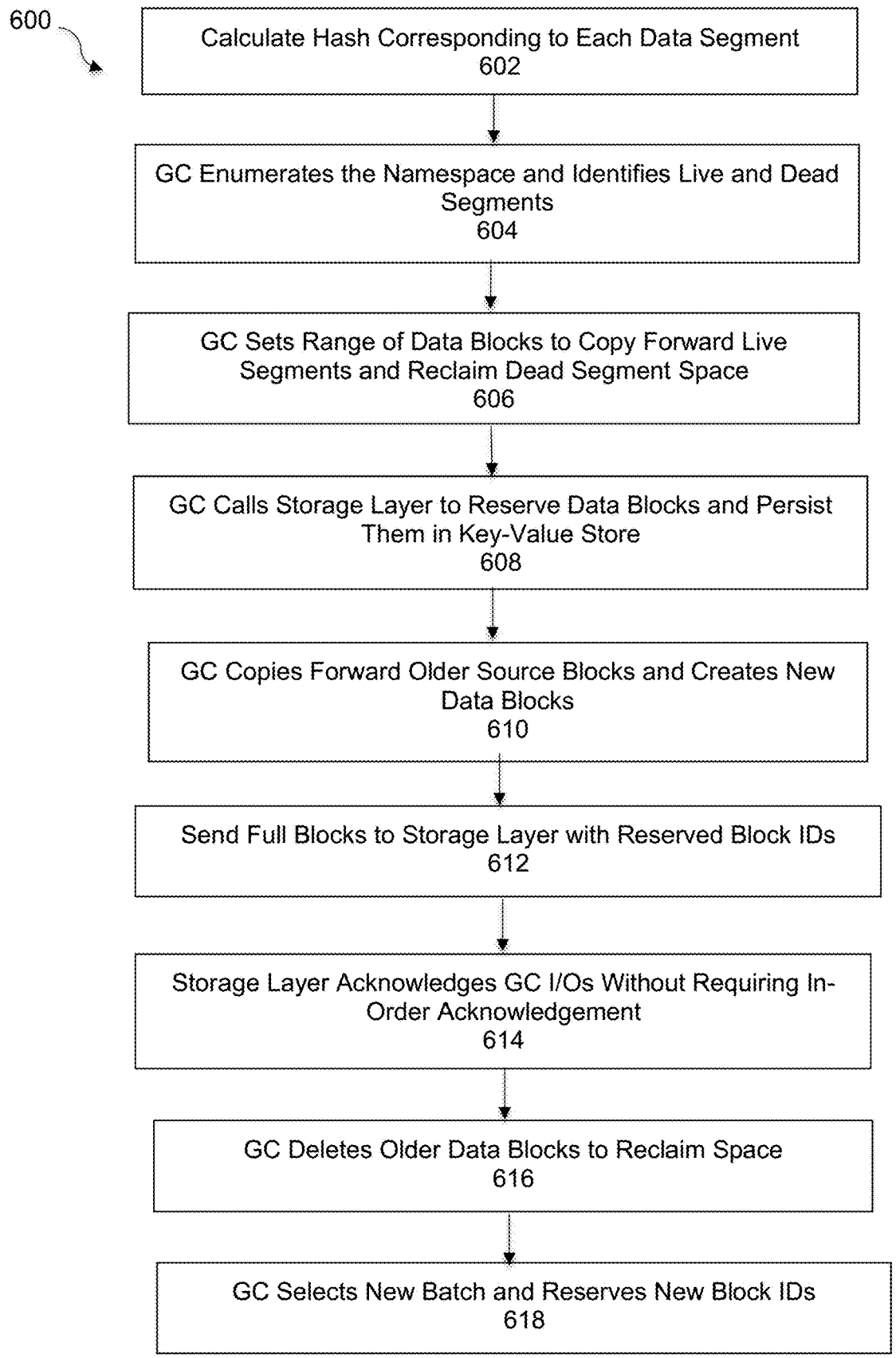
FIG. 6 is a flowchart illustrating a method of performing out-of-order write acknowledgement or garbage collection, under some embodiments.

FIG. 6 is a flowchart illustrating a method of performing out-of-order write acknowledgement or garbage collection, under some embodiments. In a deduplication file system, a Secure Hash Algorithm (SHA1) can be used to calculate the hash corresponding to each data segment, 602. This hash value is also called as fingerprint of the data segment, and Perfect Hashing can be used to uniquely represent each fingerprint in the in-memory bit vector. The garbage collection process enumerates the namespace and identifies the live and dead segments and marks the in-memory bit vector for each live segment data, 604. During the copy forward phase, GC sets the batch (or range) of data blocks to copy forward the live data segments and reclaim dead space from these blocks, 606. The GC process then calls the storage layer to reserve certain data block IDs (as shown in FIG. 5) and persist these blocks in a key-value store, 608. The GC process initiates a copy forward of older (source) blocks identified in step 606 and creates new data blocks with the live segment data stored in-memory, 610. Once these in-memory blocks are full, they are sent to the storage layer with a block_ID from the reserved block IDs (from step 608), 612.

The storage layer persists the data block and acknowledges the GC I/Os as each I/O is completed, without restricting the in-order acknowledgement, 614. As each I/O gets completed, the GC process can issue subsequent I/Os much more efficiently. At the end of the batch of data block copy forwards, the GC process will wait for all the existing I/Os to complete from the storage layer, and will delete the source (older) data blocks to reclaim dead space in the system, 616. The GC process will then select a new batch of containers (from step 608) and reserve new data block IDs (from step 608), 618. This process continues iterates in a loop, until the GC completes the whole system.

Upon a system crash or other loss event, a recovery algorithm will remove all the GC blocks beyond last GC consistency point. The recovery process knows about the blocks that have been copy forwarded during crashed GC cycle through the reserved block range persisted in key-value store. The storage layer will set the log-head to the last written block by any non-GC process. The storage layer will skip processing the blocks in the range or ranges mentioned in the key-value store, as these are managed by the GC process. This may result in holes in the block ID range and create block ID sparseness. However, this side effect is not generally an issue as entire block ID range space is a huge 64-bit space, and the number of reserved blocks is typically much smaller, proportionally.

System Implementation

With respect to the flowcharts of FIGS. 4 and 6, the functional steps may be performed by hardware processing components provided by one or more of the servers or resources of system 100 of FIG. 1. Such components may be provided or embodied as part of backup process/component 112 and process/component 120, 121, and so on. Such components may be embodied as one or more (first, second, third, etc.) hardware, processing, or programmed circuits configured to execute program instructions to perform a certain task, interfaces to transmit and receive data within a computer (node) or between computers (nodes), co-processors to perform subroutines or sub-tasks, and other similar components.

Embodiments of the processes and techniques described above can be implemented on any appropriate backup system operating environment or file system, or network server system. Such embodiments may include other or alternative data structures or definitions as needed or appropriate.

Figure 7:
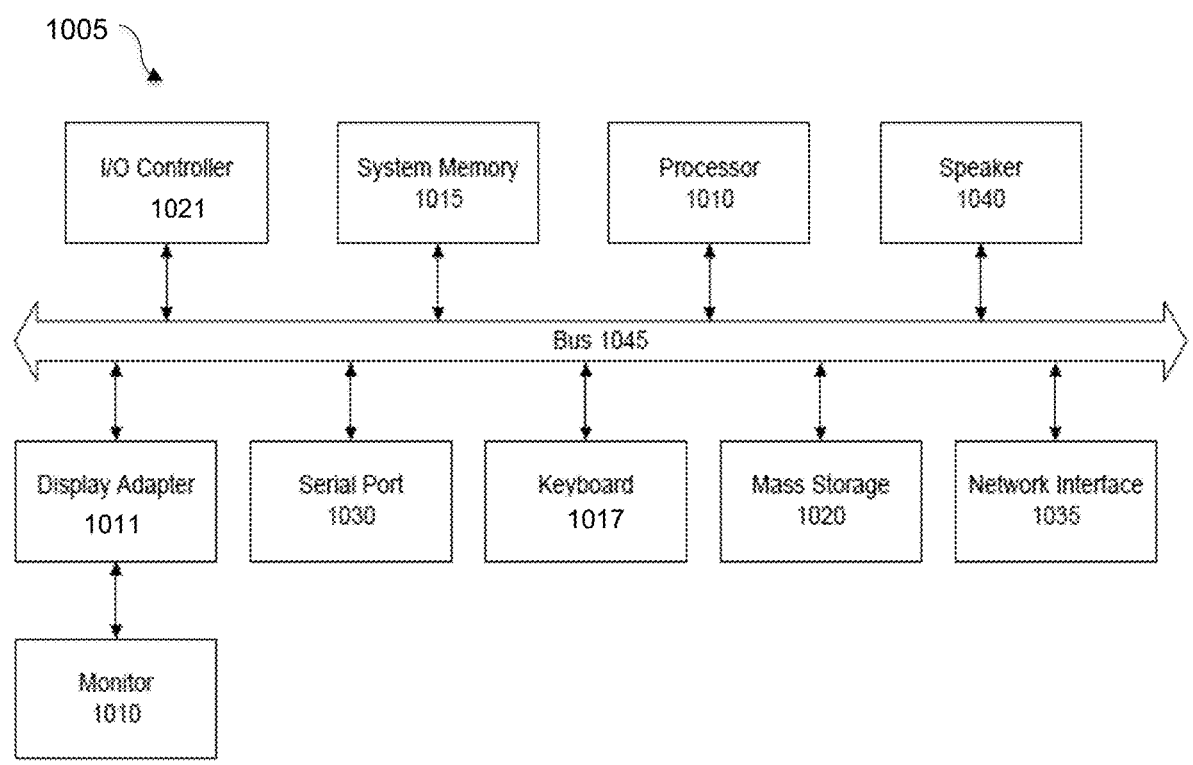
FIG. 7 is a system block diagram of a computer system used to execute one or more software components of garbage collection assisted deduplication backup system, under some embodiments.

The network of FIG. 1 may comprise any number of individual client-server networks coupled over the Internet or similar large-scale network or portion thereof. Each node in the network(s) comprises a computing device capable of executing software code to perform the processing steps described herein. FIG. 7 shows a system block diagram of a computer system used to execute one or more software components of the present system described herein. The computer system 1005 includes a monitor 1011, keyboard 1017, and mass storage devices 1020. Computer system 1005 further includes subsystems such as central processor 1010, system memory 1015, I/O controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1005 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software. An operating system for the system 1005 may be one of the Microsoft Windows®. family of systems (e.g., Windows Server), Linux, Mac OS X, IRIX32, or IRIX64. Other operating systems may be used. Microsoft Windows is a trademark of Microsoft Corporation.

The computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, among other examples), near field communication (NFC), radio-frequency identification (RFID), mobile or cellular wireless. For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of performing out-of-order write acknowledgement for a garbage collection (GC) process in a deduplication file system using data segment fingerprints, comprising:
   enumerating a namespace and identifying live and dead data segments in the namespace;
   setting, during a copy forward phase, a range of data blocks to copy forward the live data segments and reclaim storage space from the dead data segments;

calling, from a storage layer, block identifiers (IDs) for the range of data blocks as reserved data blocks for persistence to in-memory storage;

initiating the copy forward phase to copy forward the data blocks in the identified range, and creating new data blocks with live segment data in the in-memory storage;

sending to the storage layer, full in-memory storage blocks with corresponding reserved block IDs;

acknowledging, by the storage layer, GC input/output (I/O) operations as each I/O operation is completed, maintaining a strict in-order acknowledgement protocol for input/output (I/O) operation completion for a segment store layer functionally operating between a protocol layer and a storage layer; and allowing an out-of-order acknowledgement protocol for I/O operation completion for the GC process as managed by a GC layer at a same protocol level of the segment store layer.

2. The method of claim 1 further comprising:

deleting, by the GC process and after all data blocks in the range are processed, older data blocks to reclaim dead storage space;

selecting a new batch of containers from the storage layer; and reserving a new set of data block IDs for further GC operations.

3. The method of claim 1 wherein the deduplication file system implements a log-structured file system storing data and metadata in an append-only log arranged as a monotonically increasing log data structure of a plurality of data blocks in which a head of the log increases in chronological order and no allocated data block is overwritten with new data.

4. The method of claim 3 wherein the reserved data blocks comprises a contiguous set of data blocks within an entire range of data blocks of the append-only log.

5. The method of claim 2 wherein, upon a system crash, the GC process removes marked data blocks beyond a last GC consistency point.

6. The method of claim 1 wherein the segment store layer receives data from one or more external sources, and wherein the data is ingested from the external sources for use by the protocol layer and the storage layer corresponding to an order of the in-order acknowledgement protocol.

7. The method of claim 6 wherein the external sources comprises at least part of a deduplication backup system sending backup data for storage in storage devices controlled by the storage layer.

8. The method of claim 7 wherein the log-structured file system stores data and metadata in an append-only log arranged as a monotonically increasing log data structure of a plurality of data blocks in which a head of the log increases in chronological order and no allocated data block is overwritten with new data.

9. The method of claim 8 wherein the deduplication backup system creates data segments that are shared by multiple files in a namespace, and wherein some blocks, upon file expiration, contain both live data segments that are shared with another current file, and dead data segments that are not shared with any current file.

10. The method of claim 1 wherein the GC process:

performs a mark and sweep operation to identify live and dead segments within the namespace;

copies forward the live segments from older data blocks to newer data blocks; and frees the older data blocks to reclaim dead space in the storage devices.

11. The method of claim 10 wherein the out-of-order acknowledgement protocol for I/O operation completion for the GC process allows copy forward of subsequent live data segments after a previous I/O acknowledgement for a previous live data segment copy forward may have been blocked due to latency delay or other interruption.

12. A system for implementing pseudo out-of-order writes for garbage collection in a log-structured file system, comprising:

a first hardware processing component maintaining a strict in-order acknowledgement protocol for input/output (I/O) operation completion for a segment store layer functionally operating between a protocol layer and a storage layer; and a second hardware processing component allowing an out-of-order acknowledgement protocol for I/O operation completion for garbage collection (GC) processes managed by a GC layer at a same protocol level of the segment store layer.

13. The system of claim 12 wherein the segment store layer receives data from one or more external sources, and wherein the data is ingested from the external sources for use by the protocol layer and the storage layer corresponding to an order of the in-order acknowledgement protocol.

14. The system of claim 13 wherein the external sources comprises at least part of a deduplication backup system sending backup data for storage in storage devices controlled by the storage layer, and wherein the log-structured file system stores data and metadata in an append-only log arranged as a monotonically increasing log data structure of a plurality of data blocks in which a head of the log increases in chronological order and no allocated data block is overwritten with new data.

15. The system of claim 14 wherein the deduplication backup system creates data segments that are shared by multiple files in a namespace, and wherein some blocks, upon file expiration, contain both live data segments that are shared with another current file, and dead data segments that are not shared with any current file.

16. A system improving performance of garbage collection (GC) processes in a deduplicated file system having a layered processing architecture, comprising:

a log structured file system database component storing data and metadata in an append-only log arranged as a monotonically increasing log data structure of a plurality of data blocks in which a head of the log increases in chronological order and no allocated data block is overwritten with new data; and a storage layer component reserving a set of data block IDs within the log specifically for the garbage collection process, assigning data blocks from the reserved set to GC I/O processes requiring acknowledgment in an out-of-order manner relative to an order of data blocks in the log, and strictly using in-order I/O acknowledgement for other non-GC processes using the storage layer.

17. The system of claim 16 wherein the non-GC processes comprise deduplicated file system processes for a deduplication backup program using a segment store layer at a same protocol level as a GC layer of the GC process.

18. The system of claim 17 deduplication backup program creates data segments that are shared by multiple files in a namespace, and wherein some blocks, upon file expiration, will contain both live data segments that are shared with another current file, and dead data segments that are not shared with any current file.

19. The system of claim 18 wherein the out-of-order acknowledgement protocol for I/O operation completion for the GC processes allows copy forward of subsequent live data segments after a previous I/O acknowledgement for a previous live data segment copy forward may have been blocked due to latency delay or other interruption, and further wherein the GC process, upon completion of a current set of I/O operations using the reserved data block, iteratively selects a next set of reserved data blocks to perform GC I/O operations in turn using one or more subsequent sets of reserved data blocks.

* * * * *